(12) United States Patent
Simpson et al.

(10) Patent No.: US 11,718,968 B1
(45) Date of Patent: Aug. 8, 2023

(54) ELECTRICALLY HEATED SNOW SHOVEL

(71) Applicants: Kaven Simpson, Brooklyn, NY (US); Steven Rojas, Brooklyn, NY (US)

(72) Inventors: Kaven Simpson, Brooklyn, NY (US); Steven Rojas, Brooklyn, NY (US)

( * ) Notice: Subject to any disclaimer, the term of this patent is extended or adjusted under 35 U.S.C. 154(b) by 142 days.

(21) Appl. No.: 17/402,589

(22) Filed: Aug. 15, 2021

(51) Int. Cl.
*E01H 5/02* (2006.01)
*E01H 5/10* (2006.01)
*H05B 1/02* (2006.01)
*G05D 23/00* (2006.01)

(52) U.S. Cl.
CPC .............. *E01H 5/02* (2013.01); *E01H 5/10* (2013.01); *H05B 1/0252* (2013.01); *G05D 23/00* (2013.01)

(58) Field of Classification Search
CPC .. E01H 5/02; E01H 5/10; E01H 5/108; H05B 1/0252
USPC ............................................ 294/54.5; 37/230
See application file for complete search history.

(56) References Cited

U.S. PATENT DOCUMENTS

| | | | | |
|---|---|---|---|---|
| 2,699,614 | A | * | 1/1955 | Welch ................. E01H 5/10 15/236.01 |
| 4,034,489 | A | * | 7/1977 | Hughes, Jr. ............ E01H 5/10 219/201 |
| 5,357,646 | A | | 10/1994 | Kim |
| 6,003,916 | A | * | 12/1999 | Chalmers ................. E01H 5/10 294/59 |
| 6,869,118 | B2 | * | 3/2005 | Bradford ................. A01B 1/02 294/51 |
| D756,726 | S | * | 5/2016 | Packer ............................ D8/10 |
| 10,000,901 | B1 | | 6/2018 | Gallo |
| 2002/0088148 | A1 | * | 7/2002 | Kagen .................... E01H 5/066 37/227 |
| 2011/0139763 | A1 | * | 6/2011 | Glassman ................ E01H 5/02 7/158 |
| 2019/0127935 | A1 | * | 5/2019 | Campbell ................ E01H 5/02 |
| 2021/0332544 | A1 | * | 10/2021 | Rasor ..................... B25F 5/006 |

FOREIGN PATENT DOCUMENTS

KR    10-2015-0030977    *    3/2015

* cited by examiner

*Primary Examiner* — Dean J Kramer
(74) *Attorney, Agent, or Firm* — Sanchelima & Associates, P.A.; Christian Sanchelima; Jesus Sanchelima

(57) ABSTRACT

An electrically heated snow shovel including a shovel assembly and a heating assembly is disclosed. The shovel assembly includes a shaft that is connected to a handle in one distal end and to a collar of a blade in another distal end. The blade includes ridges and a tip. The heating assembly includes the heating element embedded to the ridges. The heating element is powered by a battery. The heating element may be actuated and controlled by a switch that includes a gauge. The switch includes multiple temperature settings and the switch also includes an on off option.

12 Claims, 3 Drawing Sheets

ELECTRICALLY HEATED SNOW SHOVEL

BACKGROUND OF THE INVENTION

1. Field of the Invention

The present invention relates to a electrically heated snow shovel and, more particularly, to a electrically heated snow shovel that includes a heated blade comprising an elongated handle and a battery to power a heating element located in the blade.

2. Description of the Related Art

Several designs for snow shovels have been designed in the past. None of them, however, include an electrically heated blade with a heating element powered by a battery.

Applicant believes that a related reference corresponds to U.S. Pat. No. 10,000,901 issued for a snow shovel with a propane heating mechanism. Applicant believes that another related reference corresponds to U.S. Pat. No. 5,357,646 issued for a battery powered, heated ice scraper. None of these references, however, teach of an electrically heated snow shovel with a battery to power a heating element that is located in the blade.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an electrically heated snow shovel capable of removing snow easier than the known shovels.

It is another object of this invention to provide an electrically snow shovel that includes a hot blade with a heating element.

It is still another object of the present invention to provide an electrically snow shovel that includes a battery which makes the electrically snow shovel easy to carry and to use.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
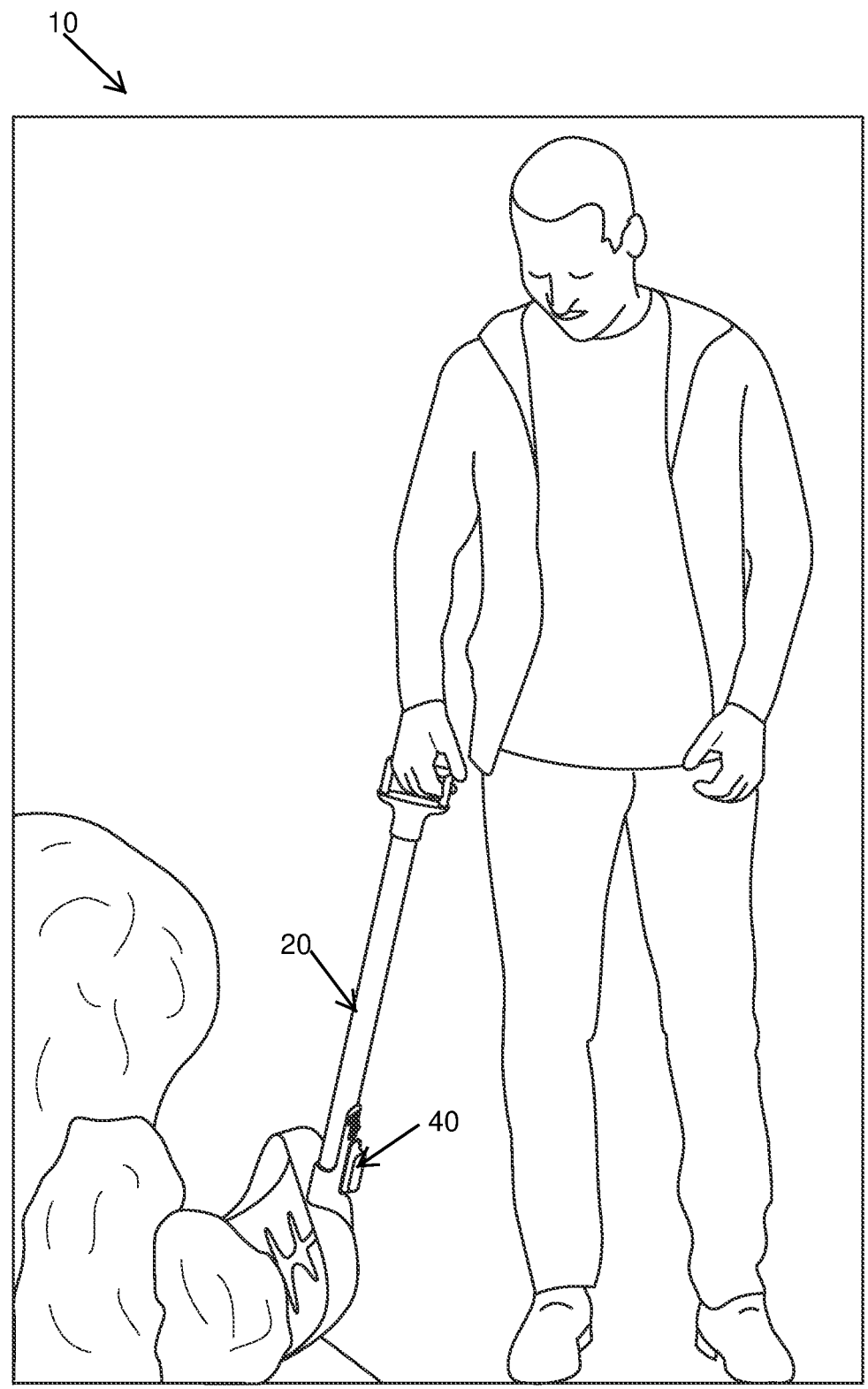
FIG. 1 illustrates the operational view of the present invention 10. A user is holding a shovel assembly with a hand. A heating assembly 40 is turned on. Therefore the user can remove snow easily as the snow is melted by the heating assembly.

Referring now to the drawings, where the present invention is generally referred to with numeral 10, it can be observed that it basically includes a shovel assembly 20 and a heating assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
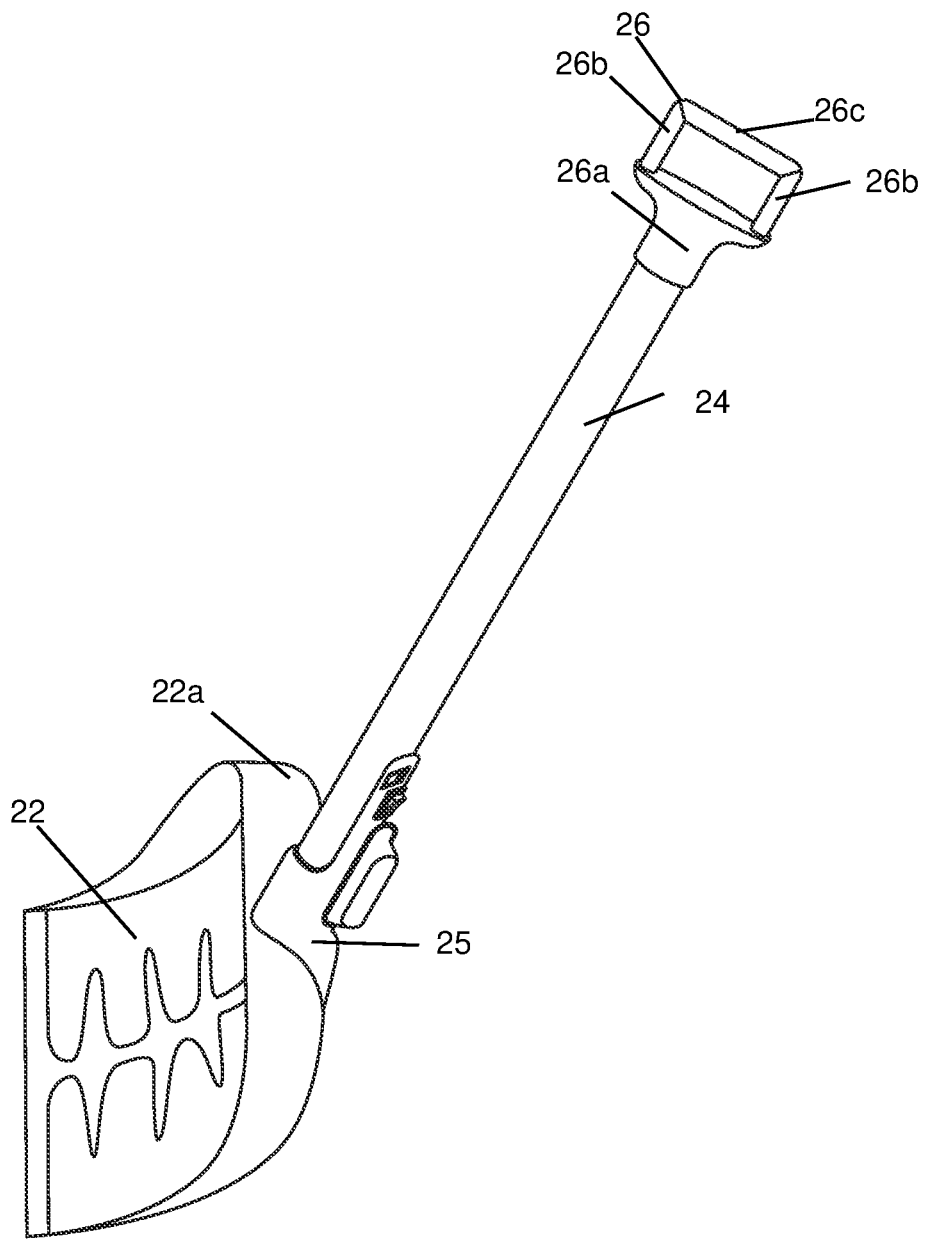
FIG. 2 shows an isometric view of the electrically heated snow shovel 10. Wherein it can be observed that a shovel assembly includes a blade 22 having a step 22a and a collar 25. The collar 25 can receive a distal end of a shaft 24 therein. Another distal end of the shaft 24 is connected to a blade collar 26a of a handle 26.

Best shown in FIG. 2, the shovel assembly 20 includes a blade 22, a shaft 24 and a handle 26. In a particular embodiment, the shaft 24 may have an elongated cylindrical shape. The shaft 24 may be made of wood, aluminum or fiberglass. The handle 26 may be connected to a first distal end of the shaft 24. In one embodiment, the handle 26 may have a collar 26a with a first distal end that may be cylindrical where the shaft 24 may be received therein. A second distal end of the collar 26a may extend towards an axis parallel to a circular face of the first distal end. Thereby defining an oval shape. The second distal end of the collar 26a may be flat. Two vertical posts 26b can be located at a flat side of the distal end of the collar 26a with the oval shape. The vertical posts 26b can be placed on the vertical axis, next to the vertices of the flat side of the collar 26a. The vertical posts 26b can be connected to a horizontal member 26c, thereby defining the handle 26.

In one embodiment, the blade 22 can be made of aluminum, copper, brass, steel, or any other metallic heat conductive material. In a preferred embodiment, the blade 22 may include a tip. The tip of the blade 22 may include a squared end. The blade 22 may include a lateral side perpendicular to the tip of the blade 22. The lateral side of the blade 22 may have the shape of an arc. Lateral sides of the blade 22 may include a laminar portion. The laminar portion of the blade 22 may extend from the tip of the blade 22 to an edge of a step 22a. The step 22a may be located at a distal end opposite to the tip of the blade 22. The step 22a may also include a laminar portion. The laminar portion of the step 22a may extend perpendicularly to the blade towards an interior of the blade 22. The blade 22 may have ridges 22b disposed on the interior of the blade 22 as it can be best observed in FIG. 3. The ridges 22b are disposed from a center of the step 22a to the tip of the blade 22. It may be suitable for the ridges 22b to be arranged in a sinusoidal pattern. The blade 22 may include a blade collar 25, the blade collar 25 may be perpendicularly located in the center of the laminar portion of the step 22a. The blade collar 25 may be cylindrical. The blade collar 25 may include an extended portion that extends at a rear portion of the blade collar 25 towards the direction of the blade collar 25. The blade collar 25 may receive a bottom distal end of the shaft 24 therein.

Figure 4:
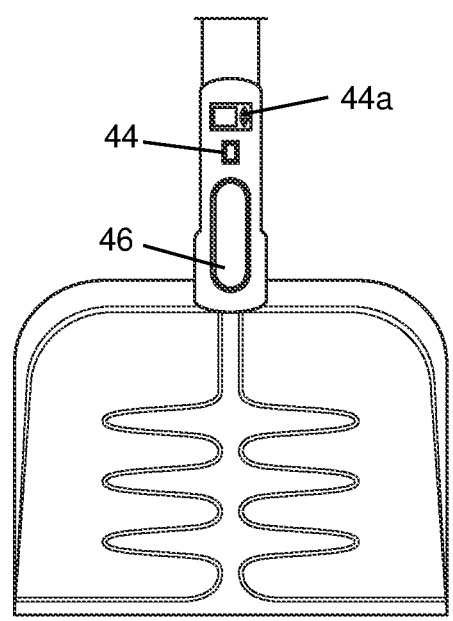
FIG. 4 is a representation of a rear view of the blade 22, wherein a switch 44, and a battery 46 are mounted to the shaft. The switch 22 can turn the present invention 10 on or off and can control the temperature of the heating element.

Best observed in FIG. 4, the heating assembly 40 includes a switch 44 and a battery 46. The battery 46 may be rechargeable. In one embodiment the switch 44 and the battery 46 may be attached to the extended portion of the blade collar 25. The switch 44 may turn on or off the electrically heated snow shovel 10. When a user selects the switch 44 as off, the switch 44 opens the connection from the battery 46 to the heating element 42. Therefore the heating element 42 loses power when the present invention 10 is turned off. When the user selects the switch 44 as on, then the battery 46 can power the heating element 42 and the heating element 42 may be heated up. The heating assembly 40 may include a gauge 44a attached to the extended portion of the blade collar 25. The gauge 44a may measure the temperature of the heating element 42. The gauge 44a may include a display to communicate the temperature selected to a user. The temperature of the heating element 42 may be selected by a user via programmable buttons located on the gauge 44a. The programmable buttons may allow a user to select a desired temperature for the heating element 42.

Figure 3:
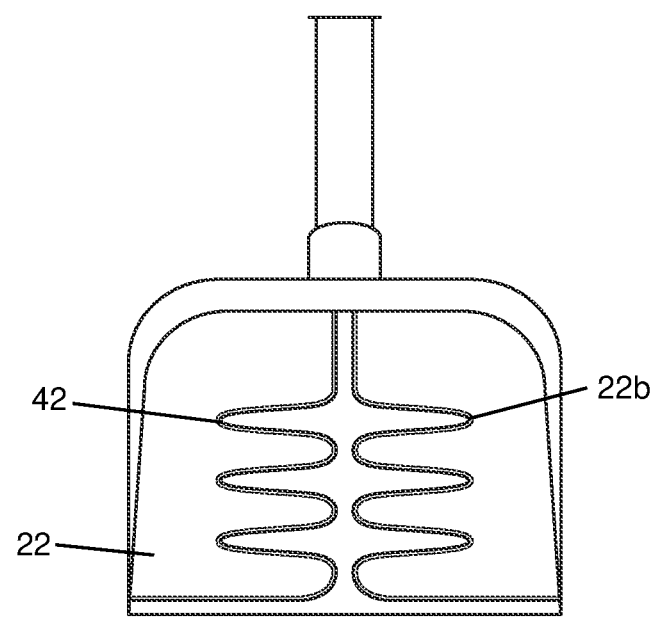
FIG. 3 illustrates a front view of the blade, wherein the ridges 22b can be observed protruding from the interior of the blade 22. The ridges 22b have a heating element 42 embedded therein that extends from the ridges 22b to the tip of the blade 22.

Referring to FIG. 3, the heating element 42 may be embedded on the ridges 22b and on the tip of the blade 22. The heating element 42 can be made of an electrical resistor or any other material that is capable of converting electric energy into heat. The heating element 42 may convert the power provided by the battery 46 into heat. The heating element 42 may heat up the blade 22. The hot blade 22 may melt snow.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electrically heated snow shovel, comprising:
   a. a shovel assembly;
   b. a heating assembly;
   c. said shovel assembly including a blade, a shaft and a handle, wherein the blade includes a blade collar that is connected to a first distal end of the shaft, wherein a second distal end of the shaft is connected to the handle, said blade including ridges disposed thereon; and
   d. said heating assembly including a heating element, a switch, and a battery, said heating element is embedded within said ridges and within a tip of the blade, said switch turns on or off the heating element, wherein said switch and said battery are located at the rear portion of the collar.

2. The electrically heated snow shovel of claim 1, wherein said blade includes a square tip.

3. The electrically heated snow shovel of claim 1, wherein said blade is made of copper.

4. The electrically heated snow shovel of claim 1, wherein said shaft is cylindrical.

5. The electrically heated snow shovel of claim 1, wherein said shaft is connected to the collar of the blade.

6. The electrically heated snow shovel of claim 1, wherein said heating element is an electric resistance that is heated up when an electric current is supplied.

7. The electrically heated snow shovel of claim 1, wherein said heating element is embedded to the ridges and to the tip of the blade.

8. The electrically heated snow shovel of claim 1, wherein said battery is rechargeable.

9. The electrically heated snow shovel of claim 1, wherein said battery supplies energy to the heating element.

10. The electrically heated snow shovel of claim 1, wherein said switch includes a gauge to measure and display the temperature of the heating element.

11. The electrically heated snow shovel of claim 1, wherein said switch has states of off, on and settings for controlling the temperature of the heating element.

12. An electrically heated snow shovel, consisting of:
    a. a shovel assembly;
    b. a heating assembly;
    c. said shovel assembly including a square blade made of copper, a cylindrical shaft and a handle, wherein the blade includes a blade collar that is connected to a first distal end of the shaft, wherein a second distal end of the shaft is connected to the handle, said blade including ridges disposed thereon, said ridges are arranged in a sinusoidal pattern; and
    d. said heating assembly including a electrical resistor, a heating element, a switch, and a rechargeable battery, said heating element is made of an electrical resistor, said heating electrical resistor converts electrical energy supplied by the rechargeable battery into heat, said electrical resistor is embedded within said ridges and within a tip of the blade, said switch turns on or off the heating element, said switch includes a gauge to measure and display the temperature of the heating element, said gauge includes programmable buttons to select a desired temperature for the heating element.

* * * * *